United States Patent
Abe et al.

(10) Patent No.: US 7,418,173 B2
(45) Date of Patent: Aug. 26, 2008

(54) WAVEGUIDE TYPE OPTICAL CONTROL ELEMENT AND PROCESS FOR ITS FABRICATION

(75) Inventors: Yoshiyuki Abe, Chiba (JP); Hiroshi Mori, Tokyo (JP); Akira Terashima, Chiba (JP)

(73) Assignee: Sumitomo Metal Mining Co., Ltd., Tokyo (JP)

(*) Notice: Subject to any disclaimer, the term of this patent is extended or adjusted under 35 U.S.C. 154(b) by 81 days.

(21) Appl. No.: 11/628,945

(22) PCT Filed: Jun. 29, 2005

(86) PCT No.: PCT/JP2005/012437

§ 371 (c)(1),
(2), (4) Date: Dec. 8, 2006

(87) PCT Pub. No.: WO2006/004139

PCT Pub. Date: Jan. 12, 2006

(65) Prior Publication Data

US 2008/0069490 A1 Mar. 20, 2008

(30) Foreign Application Priority Data

Jun. 30, 2004 (JP) .............................. 2004-192574

(51) Int. Cl.
*G02B 6/42* (2006.01)

(52) U.S. Cl. ............................... 385/40; 385/39; 385/41

(58) Field of Classification Search .................... 385/40
See application file for complete search history.

(56) References Cited

FOREIGN PATENT DOCUMENTS

| DE | 3724634 A1 | 2/1989 |
|---|---|---|
| EP | 1 416 541 A2 | 5/2004 |
| JP | 2004-287281 | * 10/2004 |

OTHER PUBLICATIONS

"Techniques of Transparent Conductive Films;" *Ohmusha, Ltd., Edited by Japan Society for the Promotion of Science*; pp. 54-57, three cover sheets and one end sheet (6 Sheets total.)/Discussed in the specification.

(Continued)

*Primary Examiner*—Hemang Sanghavi
*Assistant Examiner*—Kajli Prince
(74) *Attorney, Agent, or Firm*—Kratz, Quintos & Hanson, LLP.

(57) ABSTRACT

A waveguide type optical control element which has an optical waveguide made of an insulating material having an electro-optic effect or a thermo-optic effect, and a control electrode provided in contact with or proximity to the optical waveguide; the optical waveguide having a propagation loss which is 1 dB/cm or less at wavelengths of from 1.3 μm to 1.6 μm. The control electrode is constituted of a conductive oxide film having a carrier electron concentration of $5.5 \times 10^{20}/cm^3$ or less and a resistivity of $9.5 \times 10^{-4}$ Ωcm or less, and the conductive oxide film has a coefficient of extinction of light waves, of 0.240 or less at a wavelength of 1.55 μm.

8 Claims, 3 Drawing Sheets

OTHER PUBLICATIONS

C.M. Gee, et al.; "Minimizing dc drift in LiNbO$_3$ waveguide devices;" *Appl. Phys. Lett.*; vol. 47; No. 3; Aug. 1, 1985; pp. 211-213.

I. Safi, et al.; "The properties of reactively-sputtered, stoichiometry-controlled and optimum-conductivity transparent indium oxide films as a function of their titanium, aluminum and zinc content; comparisons with the use of tin as a dopant;" *Thin Solid Films*; vol. 343-344; 1999; pp. 115-118.

G. Campet, et al.; "The electronic effect of Ti$^{4+}$, Zr$^{4+}$ and Ge$^{4+}$ dopings upon the physical properties of In$_2$O$_3$ and Sn-doped In$_2$O$_3$ ceramics: application to new highly-transparent conductive electrodes;" *Materials Science and Engineering B*; vol. 19; No. 3; 1993; pp. 285-289.

* cited by examiner

WAVEGUIDE TYPE OPTICAL CONTROL ELEMENT AND PROCESS FOR ITS FABRICATION

TECHNICAL FIELD

This invention relates to a waveguide type optical control element for controlling the intensity, phase and polarization of light waves in optical fiber communication and optical fiber measurement.

BACKGROUND ART

In optical fiber communication systems and optical fiber measurement systems, processing is required in variety on the intensity, phase, polarization and so forth of light waves. For this purpose, light intensity modulators, photonic switches (optical switches) and optical attenuators, for example, have been developed and put into practical use.

An optical waveguide technique is available as one of such optical processing techniques. The optical waveguide technique has advantages that waveguides can be of low voltage, can be integrated with ease, can be strong and can be formed in large numbers and at a low cost. What are used as substrate materials for optical waveguides are rich in variety, such as semiconductor materials, oxide crystal materials and glass materials. In particular, in optical waveguide type intensity modulators, oxide crystal materials having electro-optic effects as typified by ferrodielectric lithium niobate and lead lanthanum titanate-zirconate are widely used as substrate materials.

Here, how control electrodes operate which are provided in contact with or proximity to optical waveguides is explained with reference to the following mathematical expressions (1) and (2):

$$\Delta\phi = (2\Pi/\lambda) \cdot \delta n \cdot L \quad (1),$$

$$\delta n = (-\frac{1}{2}) \cdot n^3 \cdot r \cdot \Gamma \cdot (V/G) \quad (2).$$

In the mathematical expression (1), $\Delta\phi$ is the level of a phase change produced by applied voltage, $\lambda$ is the wavelength of an input, $\delta n$ is the change in refractive index that is to be induced, and L is the electrode length.

In the mathematical expression (2), n is the refractive index, r is the electro-optical constant of a substrate crystal, $\Gamma$ is the parameter of light wave-electric field overlap, V is the applied voltage, and G is the gap between electrodes.

As can be seen from the mathematical expressions (1) and (2), in order to attain the phase change $\Delta\phi$ at a level as high as possible, it is necessary to attain the refractive index change $\delta n$ at a value as large as possible.

For this end, the following points are important.

(1) The gap G between electrodes is set small as far as possible. This can make the electric field have a high intensity.

(2) The parameter $\Gamma$ of light wave-electric field overlap is set large. For this end, the electrode width is set as large as possible to make lines of electric force as many as possible in a deep region in the substrate material in respect of optical guide mode distribution so that a sufficiently strong electric field can be applied.

In general, the electrode width is set maximum within the area limit of optical waveguides used, and hence the freedom of studies is limited. Accordingly, it is studied how the gap G between electrodes is made narrower.

Here are beforehand properly shown a typical structure that is common to waveguide type optical control elements making use of a lithium niobate substrate and utilizing the electro-optic effect of such a substrate material, and how to make this structure. As an example of such waveguide type optical control elements, the constitution of an optical circuit of a Mach-Zehnder interferometer type light intensity modulator and its constituent factors are exemplified in FIG. 6.

Figure 6:
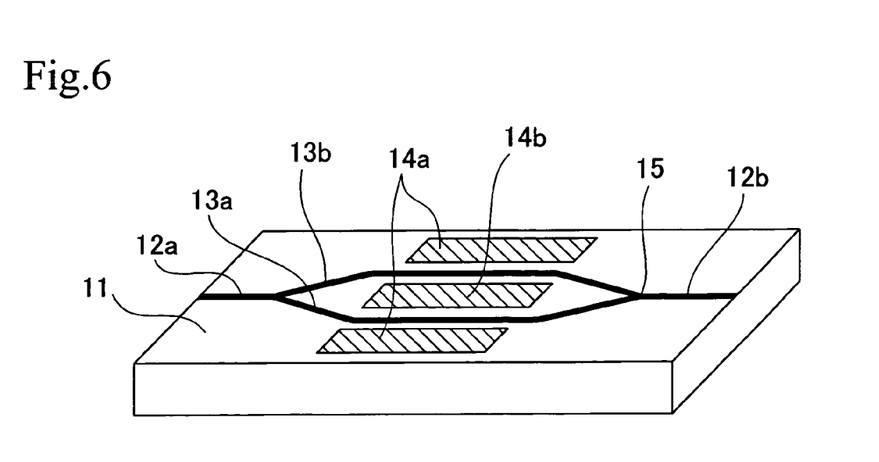
FIG. 6 is a perspective view showing an example of a waveguide type optical control element according to the prior art.

Ti metallic stripes of about 10 μm in width each are formed on a lithium niobate substrate 11 by photolithography. Thereafter, the substrate with stripes is processed at about 1,000° C. to make Ti atoms diffuse into the lithium niobate substrate. As the result, the Ti atoms diffuse thereinto in its areas of a depth of about 5 μm and a width of about 10 μm each to produce a distribution. At this part, the refractive index comes high substantially in proportion to the concentration of Ti atoms. Regions where this refractive index has come high serve as optical waveguides 12a, 12b, 13a, 13b and 15. In these regions, light waves of from 1.3 to 1.55 μm in wavelength which are used in optical fiber communication systems are propagated in a single mode.

Subsequent to the formation of the optical waveguides, $SiO_2$ is vacuum-deposited on the surface of the lithium niobate substrate in which the optical waveguides have been formed, to provide a buffer layer thereon. The buffer layer is, as its function, provided so that any metals used in electrodes may not absorb the above light waves.

Thereafter, a metal thin film is vacuum-deposited on the surface of the buffer layer, followed by patterning to form electrodes denoted by reference numerals 14a and 14b in FIG. 6. In the electrode patterning, photolithography may be used like the case of the formation of optical waveguides as described above. More specifically, usable are an etching process in which, e.g., Ti or Cr is uniformly vacuum-deposited to form a film, thereafter Au is vacuum-deposited thereon, and then unnecessary portions are removed by chemical etching; and a lift-off process in which a photoresist is applied in a pattern, thereafter a metallic material is vacuum-deposited, and subsequently the photoresist is dissolved and removed.

The Ti or Cr is used to form a first layer of each electrode, for the reason that it also has a superior adherence to the substrate material such as the lithium niobate substrate crystal and to the $SiO_2$ used as the buffer layer material. Also, the Au is used to form a second layer on the first layer, for the reason that the Au has superior electrical conductivity and environmental resistance and further makes it easy to carry out wire bonding.

Now, as stated above, the buffer layer functions so that the metals used in electrodes may not absorb the light waves propagated through the interior of optical waveguides, where there is a problem that may arise because of the presence of the buffer layer. For example, it is DC drift.

Here is explained what phenomenon the DC drift is. The electric field E of an optical waveguide region is expressed by the following mathematical expression (3), where V is the external applied voltage and g is the electrode gap.

$$E = V/g \quad (3).$$

Note, however, that g is herein not the actual electrode gap G used in the mathematical expression (1), and an electrode gap value g is introduced which is actually effective in intuitionally understanding the matter.

According to the mathematical expression (3), E is kept constant as long as V is kept constant, and the optical power is kept at a constant value. However, although the external applied voltage V is kept constant, E changes with time, so that the optical power is not kept at a constant value. Such a phenomenon may come about. This is the DC drift. This DC drift occurs as an effect brought by actually effective capacitance component and resistance component in the buffer layer itself and at the interface between the buffer layer and the optical waveguide substrate. The DC drift must be kept from occurring, in order that waveguide type optical control elements such as photonic switches and light intensity modulators are actually put into use.

Where the buffer layer is removed in order to eliminate the DC drift, any measure substituting for the buffer layer must be taken in order to prevent the light waves from being absorbed by the electrodes. In particular, in single-mode optical fiber systems, the polarization does not stand constant with time. Hence, in waveguide type optical control elements used in such systems, it is required that the element shows the same behavior in respect to both the modes of the TE mode (transverse electromagnetic mode), in which the direction of vibration of the electric-field is parallel to the substrate surface and the absorption at the electrodes is not remarkable, and the TM mode (transverse magnetic mode), in which the direction of vibration of the electric-field is vertical with time and the absorption at the electrodes is remarkable, i.e., that the element is free of dependence on polarized light.

In waveguide type optical control elements utilizing a thermo-optic effect, materials having a high transparency and an appropriately large temperature dependence of refractive index, such as quartz glass and polymeric materials, are used for substrates. Then, a strip of a metallic conductor such as Cr is set only on one arm of an interferometer, and an electric current is passed therethrough to generate Joule heat, where this heat is utilized to change the refractive index of only the one arm to consequently produce a phase difference between both arms. This phase difference brings a change in the amount of output light. This is quite the same as what is brought by the electro-optic effect.

The metallic conductor absorbs light waves like the above electrodes, and hence, where the buffer layer is not used, the metallic conductor must be separated at a certain distance from the optical waveguides. Where the buffer layer is used, the metallic conductor can be set closer to the optical waveguides, but the step of providing the buffer layer is required.

As a solution for such a complicated problem, a structure is proposed in which an ITO film (indium-tin oxide film; $In_2O_3$: Sn film), which is a conductive oxide transparent in the visible region, is used in the control electrode (see German Patent Publication No. DE3724634 A1). According to this, the ITO film as an electrode is formed on optical waveguides, and a protective-film layer is loaded thereon.

In general, when light comes incident on a substance, some part of the light is reflected, the remaining part is absorbed in the substance, and further some part thereof is transmitted therethrough. $In_2O_3$-base conductive oxide materials are n-type semiconductors, in which carrier electrons are present and their movement contributes to electrical conduction. Carrier electrons in such a conductive oxide film reflect and absorb light of the near-infrared region. The more the carrier electrons are present in the conductive oxide film, the larger the amount of reflection and absorption of the near-infrared light is (see "Techniques of Transparent Conductive Films", pp. 55-57, Ohmusha, Ltd.; Edited by Japan Society for the Promotion of Science) and the larger coefficient of extinction the conductive oxide film has.

ITO films used widely at present have a low electrical resistance, but have a carrier electron concentration of $8 \times 10^{20}$/$cm^3$ or more and shows remarkable reflection and absorption in the near-infrared region of from 1.3 to 1.6 μm in wavelength. The use of such films as control electrodes in the state they are in contact with or proximity to optical waveguides brings about a remarkable loss of the near-infrared light of from 1.3 to 1.6 μm in wavelength that travels through the interiors of optical waveguides. Accordingly, as control electrodes for optical waveguides making use of the infrared light of from 1.3 to 1.6 μm in wavelength, they are required to have a low carrier electron concentration.

Meanwhile, the resistivity ρ (electrical conductivity 1/ρ) of a substance depends on the product of the carrier electron concentration n and the mobility μ of carrier electrons (1/ρ=enμ; e: elementary electric charge). In order to materialize electrode materials having a low carrier electron concentration and a high electrical conductivity, the mobility μ of carrier electrons must be large. The mobility of carrier electrons in ITO films is approximately from 10 to 35 $cm^2$/Vsec. The mobility of carrier electrons in the n-type semiconductors indium oxide ($In_2O_3$) materials is chiefly governed by the scattering of ionized impurities or the scattering of neutral impurities. (In regard to the impurities, impurities contained in the state of ions are called the ionized impurities, and impurities contained in the state of neutrality as a result of the adsorption of surplus oxygen to surroundings are called the neutral impurities.)

When impurity elements added in order to make the carrier electron concentration higher are at a high level, carrier electrons are scattered and the mobility of carrier electrons lowers. It is possible to lower the carrier electron concentration of ITO films by introducing oxygen into the ITO films at a high level, but the mobility of carrier electrons in the ITO films further lowers because of an increase in neutral impurities which is due to the introduction of oxygen, resulting in a very low electrical conductivity.

DISCLOSURE OF THE INVENTION

The ITO films can not be said to have a sufficiently low absorption in the band of a light wavelength region of 1.55 μm that is used in the field of optical fiber communication. For example, where the above electrodes of the waveguide element, having control electrodes of 40 mm in length, are made of ITO, it is unavoidable that the loss caused by such electrodes comes to about 8 dB. Elements having such a loss level can not be said to be practical, and are required to be of much lower loss.

As long as the absorption of light waves by electrodes can be lessened, not only the insertion loss of the element can be lessened, but also it leads to the achievement of a low drive voltage. This is because, as long as such optical absorption is lessened, the electrode distance can be more narrowed when the loss is set constant. Making the electrode distance narrower brings a stronger electric field in the optical waveguide region when the voltage is assumed to be the same.

Thus, making the electrode distance narrower enables induction of changes in refractive index at a certain value even at a low voltage, and eventually an element drivable at a low voltage can be materialized.

The present invention has been made taking note of such a problem. Accordingly, an object of the present invention is to provide a waveguide type optical control element which has been kept from DC drift and also can achieve low-voltage drive and a low loss against any incident polarized light, and a process for its fabrication.

That is, the present invention is a waveguide type optical control element which comprises an optical waveguide made of an insulating material having an electro-optic effect or a thermo-optic effect, and a control electrode provided in contact with or proximity to the optical waveguide; the optical waveguide having a propagation loss which is 1 dB/cm or less at wavelengths of from 1.3 μm to 1.6 μm; wherein;

the control electrode is constituted of a conductive oxide film having a carrier electron concentration of $5.5 \times 10^{20}/cm^3$ or less and a resistivity of $9.5 \times 10^{-4}$ Ωcm or less, and the conductive oxide film has a coefficient of extinction of light waves, of 0.240 or less at a wavelength of 1.55 μm.

According to experiments and investigation made by the present inventors, an electrode film not causative of any increase in reflection and absorption of near-infrared rays of from 1.3 to 1.6 μm in wavelength (i.e., not causative of any increase in extinction coefficient) is required to have a carrier electron concentration of $5.5 \times 10^{20}/cm^3$ or less, and preferably $4.0 \times 10^{20}/cm^3$ or less, and the electrode film can be useful to the control electrodes for optical waveguides as long as it fulfills this condition and fulfills the condition that its resistivity is $9.5 \times 10^{-4}$ Ωcm or less.

The conductive oxide film that fulfills such conditions may be constituted of a crystalline conductive oxide film composed chiefly of indium oxide and containing a titanium element in a proportion of from 0.003 to 0.120 as the ratio of titanium to indium in number of atoms.

This is because, inasmuch as the conductive oxide film is crystalline, it can remarkably be improved in electrical conductivity in virtue of a striking enhancement of mobility, compared with oxide films which are amorphous and have the same composition. Here, in forming the conductive oxide film by sputtering, the film may be formed in the state the substrate is heated to a temperature of 140° C. or more, whereby a completely crystalline film can be obtained. Besides, such crystallization can likewise be effected by forming an oxide film which contains amorphous phases, by sputtering at a substrate temperature of less than 140° C., followed by heat treatment at 150° C. or more. If the heat treatment is carried out for a long time in the atmosphere, surplus oxygen may be introduced into the oxide film to make the film have a low electrical conductivity. However, it may be carried out in a vacuum (e.g., 1 Pa or less) or in an atmosphere of an inert gas (such as nitrogen or argon), whereby the oxide film can be prevented from having a low electrical conductivity due to any surplus oxidation of the film, and a low-resistivity crystalline film can stably be obtained. Even in the case of the heat treatment carried out in the atmosphere, it may be carried out at a temperature and for a time which are as low and short as possible, e.g., at 150 to 200° C. and for about 10 minutes, whereby the crystalline film can be obtained while being prevented from having a poor electrical conductivity. Here, the conductive oxide film as the control electrode may preferably be in a thickness of from 100 nm to 5 μm for the reasons stated later.

On the surface of the conductive oxide film as the control electrode, a metallic single-layer film or a multi-layer film may also be formed as an auxiliary electrode. Such an auxiliary electrode is provided for the following reasons. Although the control electrode formed of a conductive oxide has a low electrical resistance, it has a much higher electrical resistance when compared with typical metals as exemplified by gold, aluminum and titanium. Accordingly, when the electrode formed of a conductive oxide has a length of as large as about 40 mm, the electrical resistance of the electrode may adversely affect the properties of optical waveguide devices. For example, in elements required to have a high-speed response, a delay comes about which is due to the electrical resistance of the electrode. Also, where electrical power input is large, heat generation takes place when the electrode has a high electrical resistance. How to solve such a problem to make the most of characteristic features inherent in conductive oxides is to make the most of both the high electrical conductivity (low electrical resistance) of typical metals and the transparency of conductive oxides.

Stated specifically, an electrode pattern having, e.g., a gap of 20 μm between electrodes, and a width of 50 μm for each of electrodes on both sides of optical waveguides is first formed using a conductive oxide, and thereafter, superposedly thereon, an electrode pattern having a larger gap between electrodes than that of the electrode pattern first loaded using the conductive oxide, e.g., a gap of 40 μm between electrodes is formed using a typical metal such as gold, aluminum or titanium. The wiring from electrodes on the substrate is so made as to be served by the metal film loaded afterwards. Having been made in this way, the gap between electrodes formed using the typical metal is sufficiently so large as not to contribute to the loss of light. This can also overcome the disadvantage that the electrodes formed only of the conductive oxide have a higher electrical resistance than those formed of the typical metal.

The waveguide type optical control element according to the present invention may be fabricated by a process comprising the step of forming as a control electrode a conductive oxide film on, or in the vicinity of, an optical waveguide made of an insulating material having an electro-optic effect or a thermo-optic effect, where the film is formed by sputtering or ion plating making use of, as a raw material, an oxide sintered product which contains indium and titanium.

In forming the conductive oxide film as a control electrode by the sputtering, the film may be formed under conditions that the distance between a substrate of the optical waveguide and a target is from 50 mm to 80 mm, the oxygen level in a film forming gas during film formation by sputtering is from 0.25% to 4% based on the level of argon gas, the film forming gas is at a pressure of from 0.3 Pa to 1.0 Pa, and the temperature of the substrate is set at from 140° C. to 350° C. Besides, in forming the conductive oxide film as a control electrode, the oxide film may also be formed by sputtering carried out under conditions that the distance between a substrate of the optical waveguide and a target is from 50 mm to 80 mm, the oxygen level in a film forming gas during film formation by sputtering is from 0.25% to 4% based on the level of argon gas, the film forming gas is at a pressure of from 0.3 Pa to 1.0 Pa, and the temperature of the substrate is set at less than 140° C., and thereafter the oxide film formed is subjected to heat treatment at from 150° C. to 350° C. This heat treatment may preferably be carried out in a vacuum or in an atmosphere of an inert gas.

In the foregoing, sputtering and ion plating are exemplified as methods of forming the conductive oxide film as a control electrode. Examples are by no means limited to these film forming methods, and, as a matter of course, other applicable film forming methods may also be employed.

As described above, the waveguide type optical control element according to the present invention is characterized in that the control electrode of the optical waveguide is constituted of a conductive oxide film having a carrier electron concentration of $5.5 \times 10^{20}/cm^3$ or less and a resistivity of $9.5 \times 10^{-4}$ Ωcm or less, and the conductive oxide film has a coefficient of extinction of light waves, of 0.240 or less at a wavelength of 1.55 μm.

The employment of the conductive oxide film whose carrier electron concentration and so forth have been specified enables omission of the formation of the buffer layer to keep the DC drift from occurring, and also enables achievement of low-voltage drive and a low loss against any incident polarized light.

The titanium-added, crystalline indium oxide conductive oxide film material (In—Ti—O, hereinafter "ITiO") may also be used as a material for the conductive oxide film. This brings markedly superior light wave transmission properties in the near-infrared region, compared with ITO (In—Sn—O) materials used chiefly in the past, so that the electrodes can be designed in a narrow electrode gap, and a waveguide type optical control element can be obtained which has low-voltage properties and low-loss properties simultaneously against the incident polarized light in both TE and TM modes.

The titanium-added, crystalline indium oxide conductive oxide film material (ITiO) may still also be used as a heating element in the waveguide type optical control element making use of the thermo-optic effect. This enables, in virtue of its low light absorption properties, the heating element to be set close to optical waveguides almost without any limitation, and enables efficient induction of changes in refractive index, leading to the achievement of a low electric power.

Thus, according to the present invention, optical modulators, electro-optic photonic switches, polarized-light control devices and variable optical attenuators can be provided which are utilizable in optical fiber communication in the infrared region, promise a very small loss, and also are drivable at low voltages and of high performance. Hence, the present invention is very useful in its industrial application.

BEST MODES FOR PRACTICING THE INVENTION

The present invention provides the waveguide type optical control element in which its optical waveguide has a propagation loss which is 1 dB/cm or less at wavelengths of from 1.3 µm to 1.6 µm and its control electrode has a coefficient of extinction of light waves, of 0.240 or less at a wavelength of 1.55 µm; and a process for its fabrication.

Herein, the insertion loss of the waveguide type optical control element corresponds to the sum of a loss due to the input and output of light to the element, a loss due to optical waveguides (propagation loss×optical waveguide length) and a loss due to the control electrode (excess loss×electrode length).

In the present invention, the specific conductive oxide film is used as the control electrode of the waveguide type optical control element. Stated specifically, the conductive oxide film is used which has a carrier electron concentration of $5.5\times10^{20}$/cm$^3$ or less and a resistivity of $9.5\times10^{-4}$ Ωcm or less. The use of such a conductive oxide film materializes that the optical waveguide has the propagation loss which is 1 dB/cm or less at wavelengths of from 1.3 µm to 1.6 µm and the control electrode has the coefficient of extinction of light waves, of 0.240 or less at a wavelength of 1.55 µm.

Stated more specifically, as shown in Examples, the present invention makes use of the crystalline conductive oxide film composed chiefly of indium oxide and containing a titanium element in a proportion of from 0.003 to 0.120 as the ratio of titanium to indium in number of atoms. Also, the feature that the conductive oxide film is crystalline as described previously enables remarkable improvement in electrical conductivity, compared with oxide films which are amorphous and have the same composition. This is because, in virtue of what is made into such a crystalline film, the titanium substitutes the indium oxide at its position of indium to form a film having a high mobility of carrier electrons. When the conductive oxide film is formed by sputtering, the film may be formed in the state the substrate is heated to a temperature of 140° C. or more, whereby a completely crystalline film can be obtained. Besides, such a completely crystalline conductive oxide film can likewise be obtained also by forming an oxide film which contains amorphous phases, by sputtering at a substrate temperature of less than 140° C., followed by heat treatment at 150 to 350° C. This heat treatment may preferably be carried out, e.g., in an atmosphere of an inert gas such as nitrogen or argon. This is because, if the film is heat-treated in an atmosphere tending to cause oxidation, oxygen may be incorporated in the film in excess, so that the neutral impurities may increase to bring about a lowering of the mobility of carrier electrons, making it difficult to obtain a film having a superior electrical conductivity.

How to form the optical waveguides and control electrodes in the present invention is described next.

As mentioned previously, Ti metallic stripes of about 10 µm in width each are vacuum-deposited on a lithium niobate substrate by photolithography. Thereafter, the substrate with stripes is exposed to a high temperature of about 1,000° C. for 5 to 10 hours to make Ti atoms diffuse into the substrate. Thus, regions of about 5 µm in depth and about 10 µm in width each in which the refractive index has come high form single-mode optical waveguides.

Next, a crystalline indium oxide conductive oxide film containing titanium, used for control electrodes, is formed by sputtering or ion plating.

More specifically, in the sputtering, for example an indium oxide sintered product target which contains titanium is used, and the substrate with optical waveguides and the target are placed in a sputtering system. This substrate is heated to a stated temperature in an argon inert gas atmosphere which contains oxygen gas. An electric field is applied across this substrate and the target to cause plasma to take place between the target and the substrate to form, on the substrate, a conductive oxide film a part of indium in the indium oxide of which has been substituted with titanium.

In the other process ion plating, for example an indium oxide sintered product tablet which contains titanium is used, and the substrate with optical waveguides and the tablet are placed in a copper hearth in an ion plating system. This substrate is heated to a stated temperature in an argon inert gas atmosphere which contains oxygen gas. The tablet is evaporated from the copper hearth by using an electron gun to cause plasma to take place in the vicinity of the substrate, whereby the vapor from the tablet is ionized, to form, on the substrate, a conductive oxide film a part of indium in the indium oxide of which has been substituted with titanium.

The content of titanium in the conductive oxide film may be changed by changing the content of titanium in the target or tablet. Here, the structure and crystallinity of the conductive oxide film to be formed depend on film forming conditions such as the amount of the titanium to be contained in the conductive oxide film, the substrate heating temperature, the oxygen partial pressure in the inert gas atmosphere, and the rate of film formation.

Such conditions can not specifically be limited because they may change depending on the film forming system. For example, where the film is formed using a commercially available usual sputtering system, it is preferable that the distance between the target and the substrate is set at 50 to 80 mm, the oxygen level in film forming gas during the sputtering film formation is set at 0.25 to 4% based on the level of argon gas and the film forming gas pressure is set at 0.3 to 1.0 Pa.

If the oxygen level in film forming gas is less than 0.25%, the level of oxygen deficiency of indium oxide phases may come large to make carrier electrons generated in so large a number that only a conductive oxide film having a low transmittance in the infrared light region may be obtained. If on the other hand the oxygen level in film forming gas is more than 4%, surplus oxygen may be introduced in the surroundings of titanium impurity elements present in the indium oxide to cause an increase in the neutral impurities, so that the mobility of carrier electrons may lower to make it impossible to obtain a conductive oxide film having a low electrical resistance.

The film forming gas pressure influences the kinetic energy of sputter particles reaching the substrate during the sputtering. If the film forming gas pressure is less than 0.3 Pa, the sputter particles may have so high kinetic energy that the conductive oxide film may undergo re-sputtering because of such sputter particles to provide only a conductive oxide film having rough surfaces. If on the other hand the film forming gas pressure is more than 1.0 Pa, the sputter particles may have so low kinetic energy that the sputter particles having reached the substrate may cause no migration on the substrate to provide only a conductive oxide film which is porous and has a low density. Such a conductive oxide film has carrier electrons greatly scattering at grain boundaries, and has a high resistivity.

In the crystalline conductive oxide film, the titanium substitutes part of the indium in the indium oxide to come into solid solution to have a high mobility of carrier electrons and a low resistivity. To obtain the crystalline conductive oxide film, an amorphous conductive oxide film may first be obtained without operating the substrate temperature and then heat treatment may be carried out to form the crystalline conductive oxide film. Since, however, the crystalline conductive oxide film can be obtained by forming the film at the substrate temperature set previously at 140 to 350° C., it is preferable to carry out the sputtering while heating the substrate to a temperature of from 140 to 350° C. If the substrate temperature is less than 140° C., a film may be formed which is completely amorphous or in which amorphous phases and crystalline phases are mixedly present, to make it unable to obtain a completely crystalline conductive oxide film. If on the other hand the substrate is heated to a temperature of more than 350° C., it takes a time to set the substrate to such a temperature, and it is impossible to do so in practical use.

Even in the case when the conductive oxide film containing amorphous phases is formed, obtained by sputtering at the substrate temperature of less than 140° C. as stated above, the film formed can likewise be crystallized by its heat treatment at a temperature of 150° C. or more. If the heat treatment is carried out for a long time in the atmosphere, surplus oxygen may be introduced into the oxide film to make the film have a low electrical conductivity. However, it may be carried out in a vacuum (e.g., 1 Pa or less) or in an atmosphere of an inert gas (such as nitrogen or argon), whereby the oxide film can be prevented from having a low electrical conductivity due to any surplus oxidation of the film, and a low-resistivity crystalline film can stably be obtained. Even in the case of the heat treatment carried out in the atmosphere, it may be carried out at a temperature and for a time which are as low and short as possible, e.g., at 150 to 200° C. and for about 10 minutes, whereby the crystalline film can be obtained while being prevented from having a poor electrical conductivity.

The conductive oxide film may be in a layer thickness of from 100 nm to 5 μm, and preferably from 200 nm to 1 μm. This is preferable in view of electrical conductivity and readiness for pattern formation of the electrodes.

The conductive oxide film formed is subjected to reactive ion etching to remove part of the film to form an electrode pattern having conductive oxide films as electrodes. As an etchant therefor, an etching gas composed chiefly of HBr may be used, which is usually used for ITO.

In the method in which the conductive oxide film containing amorphous phases is formed by sputtering at the substrate temperature of less than 140° C. and thereafter subjected to heat treatment to obtain the crystalline conductive oxide film, the electrode pattern may be formed after the heat treatment by forming a pattern by a lift-off process making use of a resist material, before the step of heat treatment is carried out.

The waveguide type optical control element according to the present invention, formed by such a process, has good electro-optic characteristics, and is favorably used as an element for controlling the intensity, phase and polarization of light waves in optical fiber communication and optical fiber measurement.

An example of the waveguide type optical control element according to the present invention is described below in detail with reference to the drawing.

Figure 1:
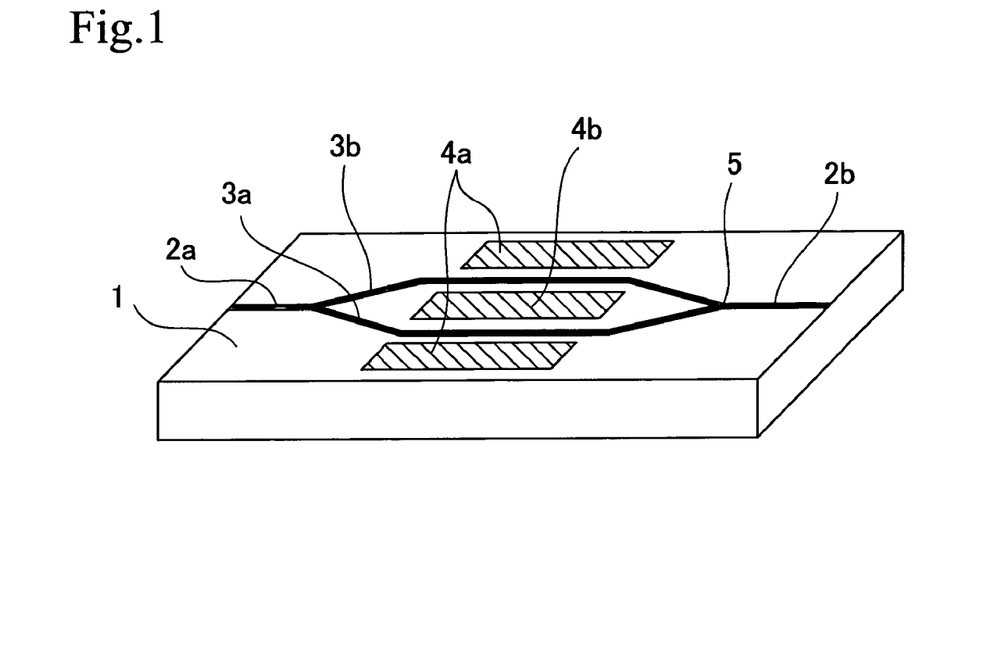
FIG. 1 is a perspective view showing an example of the waveguide type optical control element according to the present invention.

FIG. 1 is a perspective view showing an example of the waveguide type optical control element according to the present invention. In FIG. 1, reference numeral 1 denotes a single-crystal lithium niobate substrate, reference numerals 2a and 2b denote channel type linear optical waveguides, and reference numerals 3a and 3b denote channel type optical waveguides (arms) constituting a Mach-Zehnder interferometer. Reference numerals 4a and 4b denote crystalline conductive oxide films composed chiefly of indium oxide and containing titanium. These conductive oxide films are used as control electrodes.

Laser beams are made incident on this waveguide type optical control element on its light-incident side of the channel type linear optical waveguide 2a. Here, a voltage is applied cross the control electrodes 4a and 4b, whereupon the refractive index of optical waveguide regions changes because of the electro-optic effect to produce a phase change between light beams propagated through both the arms 3a and 3b of the Mach-Zehnder interferometer, where the light beams interfere with each other at a Y-branched optical waveguide 5 at which their light waves join, so that the light beam propagated through the channel type linear optical waveguide 2b changes in its intensity. More specifically, the controlling of the voltage to be applied across the control electrodes 4a and 4b enables control of the intensity of the light beam emergent from the channel type linear optical waveguide 2b. This action is utilized to materialize a waveguide type light intensity modulator or variable optical attenuator.

Here, since the control electrodes 4a and 4b are crystalline conductive oxide films composed chiefly of indium oxide and containing titanium, the light can not easily come absorbed by the electrodes, and this can make the electrodes sufficiently set close to the optical waveguides to enable saving of the voltage to be applied, i.e., the drive voltage.

For example, regarding the control electrodes of the waveguide type optical control element shown in FIG. 1 and where the crystalline conductive oxide film composed chiefly of indium oxide and containing the titanium element in a proportion of 0.05 as the ratio of titanium to indium in number of atoms is formed by sputtering, followed by patterning to form control electrodes, the loss (excess loss) due to electrodes in each mode of TE and TM is 0.1 dB/cm or less without regard to the value of electrode gaps when the value of electrode gaps is 20 μm or more. When the value of electrode gaps is less than 20 μm, the loss due to electrodes increases gradually with a decrease in the value of electrode gaps, and is 0.2 dB/cm when that value is 10 μm.

The wiring to be led around on the substrate is also usually formed by the same process as the formation of the electrodes. Where the wiring is complicate or where waveguide type optical control elements having different kinds of functions should be formed on the same substrate, it is commonly unavoidable that such wiring electrically led around and the optical waveguides intersect one another. Even where the wiring is added right above the optical waveguides, the loss increases only by 1 dB/cm, and hence only slight loss may come about when wiring led around in a width of about 50 μm crosses the optical waveguides.

After the crystalline conductive oxide film composed chiefly of indium oxide and containing titanium has been formed and subjected to patterning, the control electrodes 4a and 4b formed may also be provided with metal films (e.g., stacked films of Ti and Au) formed auxiliary on their surfaces (i.e., structure of ITiO/Ti/Au). This makes the light not easily come absorbed by the electrodes, and hence can make the electrodes sufficiently set close to the optical waveguides to enable saving of the voltage to be applied, i.e., the drive voltage.

For example, regarding the control electrodes of the waveguide type optical control element shown in FIG. 1 and where the crystalline conductive oxide film composed chiefly of indium oxide and containing the titanium element in a proportion of 0.05 as the ratio of titanium to indium in number of atoms is formed by sputtering in a thickness of about 300 nm, followed by patterning to form conductive oxide films, and thereafter, on the surfaces of these conductive oxide films (control electrodes), Ti films of 110 nm and Au films of 60 nm have been formed in order by vacuum deposition, the loss (excess loss) due to electrodes in each mode of TE and TM is 0.1 dB/cm or less without regard to the value of electrode gaps when the value of electrode gaps is 20 μm or more. When the value of electrode gaps is less than 20 μm, the loss due to electrodes increases gradually with a decrease in the value of electrode gaps, and is 0.2 dB/cm when that value is 10 μm. Even where the Ti—Au films are added right above the optical waveguides, the loss increases only by 1 dB/cm, and hence only slight loss may come about at the electrode wiring which crosses the optical waveguides.

The loss (excess loss) due to the electrodes of the waveguide type optical control element shown in FIG. 1 also depends on the layer thickness of the conductive oxide film constituting the control electrodes, and shows a tendency that the excess loss decreases with an increase in the layer thickness of the conductive oxide film. For example, where the gap between electrodes is in a value of 10 μm, the excess loss is a low loss of 0.2 dB/cm or less even when the layer thickness of the conductive oxide film is 150 nm or more. Even where the Ti—Au films are added right above the optical waveguides, the loss increases only by 1 dB/cm when the layer thickness is 200 nm or more, and hence only slight loss may come about at the electrode wiring which crosses the optical waveguides.

The present invention is described below in greater detail by giving Examples. The technical subject matter of the present invention is by no means limited by these Examples.

EXAMPLES 1 TO 9

Formation of crystalline titanium-containing indium oxide films (ITiO films):

On Corning 7059 glass substrates of 1.1 mm in thickness each, crystalline conductive oxide films of 200 nm in layer thickness each and containing titanium in proportions ranging from 0.003 to 0.120 as the ratios of titanium to indium in number of atoms were formed by sputtering, using ITiO targets composed chiefly of indium oxide and containing titanium in concentrations different from one another.

The films were formed by sputtering carried out using the above targets (of 6 inches each in diameter), under application of a direct-current power of 160 W, by the use of argon gas mixed with 1% of oxygen, at a gas pressure of 0.6 Pa at the time of sputtering, setting the target-to-substrate distance at 60 mm and setting the substrate temperature at 200° C. By using the targets having different titanium concentrations, indium oxide thin films were formed which contained titanium in the proportions shown in the column of "Film composition, Ti/In ratio in number of atoms" in Table 1.

Then, the value of resistivity of each indium oxide thin film formed was calculated from the layer thickness and the value of surface resistance measured by the four-probe method. The carrier electron concentration and mobility in each indium oxide thin film were also determined from the above measurement of resistivity and by the measurement of hole effect by the van der Paw method (see, e.g., what is described in Physical-Engineering Experiments 2, Semiconductor Techniques Volume One, p. 105, by Katsufusa Shono, Tokyo University Publisher's Association) using a hole effect measuring instrument (manufactured by Toyo Corporation). The optical constants [refractive index (n), extinction coefficient (k)] of each indium oxide thin film were still also measured by spectral elipsometry (polarization analysis). The results of these are shown in Table 1.

As can be seen from Table 1, not only the indium oxide films containing titanium in the range of Ti/In ratio of from 0.003 to 0.120 in number of atoms have resistivities of as low as $1.9 \times 10^{-4}$ to $7.1 \times 10^{-4}$ Ωcm, but also their coefficients of extinction of light waves at wavelengths of from 1.3 to 1.6 μm, used frequently in optical communication, in particular, coefficients of extinction of light waves at a wavelengths of 1.55 μm, are very smaller than those of conventional ITO films reported later.

TABLE 1

| Example: | Film composition, Ti/In ratio in number of atoms | Carrier electron concentration (/cm³) | Mobility of carrier electrons (cm²/Vsec) | Film resistivity (Ωcm) | Extinction coefficient k | | |
|---|---|---|---|---|---|---|---|
| | | | | | 1.3 μm | 1.55 μm | 1.6 μm |
| 1 | 0.003 | $2.4 \times 10^{20}$ | 58 | $4.5 \times 10^{-4}$ | 0.023 | 0.041 | 0.043 |
| 2 | 0.008 | $2.5 \times 10^{20}$ | 84 | $3.0 \times 10^{-4}$ | 0.028 | 0.052 | 0.055 |
| 3 | 0.017 | $2.9 \times 10^{20}$ | 90 | $2.4 \times 10^{-4}$ | 0.032 | 0.060 | 0.068 |
| 4 | 0.024 | $4.0 \times 10^{20}$ | 75 | $2.1 \times 10^{-4}$ | 0.038 | 0.067 | 0.075 |
| 5 | 0.033 | $3.9 \times 10^{20}$ | 77 | $2.1 \times 10^{-4}$ | 0.042 | 0.071 | 0.082 |

TABLE 1-continued

| Example: | Film composition, Ti/In ratio in number of atoms | Carrier electron concentration (/cm$^3$) | Mobility of carrier electrons (cm$^2$/Vsec) | Film resistivity (Ωcm) | Extinction coefficient k | | |
|---|---|---|---|---|---|---|---|
| | | | | | 1.3 μm | 1.55 μm | 1.6 μm |
| 6 | 0.055 | 3.9 × 10$^{20}$ | 85 | 1.9 × 10$^{-4}$ | 0.048 | 0.087 | 0.097 |
| 7 | 0.088 | 5.5 × 10$^{20}$ | 60 | 1.9 × 10$^{-4}$ | 0.095 | 0.240 | 0.260 |
| 8 | 0.100 | 3.0 × 10$^{20}$ | 51 | 4.1 × 10$^{-4}$ | 0.039 | 0.062 | 0.071 |
| 9 | 0.120 | 2.0 × 10$^{20}$ | 44 | 7.1 × 10$^{-4}$ | 0.022 | 0.035 | 0.039 |

EXAMPLES 10 TO 15

Using the target used in Example 3, titanium-containing indium oxide thin films were formed in the same manner as in Example 3 except that only the oxygen level during the sputtering was decreased or increased (0.25% to 4%).

Then, the carrier electron concentration, the mobility of carrier electrons, the resistivity of each film and the extinction coefficient of each film at wavelengths of 1.3 μm, 1.55 μm and 1.6 μm were measured under the same conditions. The results are shown in Table 2.

TABLE 2

| Example: | Oxygen level (%) | Carrier electron concentration (/cm$^3$) | Mobility of carrier electrons (cm$^2$/Vsec) | Film resistivity (Ωcm) | Extinction coefficient k | | |
|---|---|---|---|---|---|---|---|
| | | | | | 1.3 μm | 1.55 μm | 1.6 μm |
| 10 | 0.25 | 5.1 × 10$^{20}$ | 44 | 2.8 × 10$^{-4}$ | 0.099 | 0.210 | 0.245 |
| 11 | 0.5 | 3.2 × 10$^{20}$ | 50 | 3.9 × 10$^{-4}$ | 0.048 | 0.062 | 0.078 |
| 12 | 1.5 | 3.1 × 10$^{20}$ | 73 | 2.8 × 10$^{-4}$ | 0.030 | 0.059 | 0.066 |
| 13 | 2 | 2.5 × 10$^{20}$ | 61 | 4.1 × 10$^{-4}$ | 0.029 | 0.058 | 0.065 |
| 14 | 3 | 1.9 × 10$^{20}$ | 51 | 6.5 × 10$^{-4}$ | 0.026 | 0.055 | 0.061 |
| 15 | 4 | 1.5 × 10$^{20}$ | 44 | 9.5 × 10$^{-4}$ | 0.024 | 0.053 | 0.058 |

These films were those formed using the same target (the target used in Example 3), and were compositionally analyzed by ICP (inductively coupled plasma) emission spectroscopic analysis to find that these were in Ti/In ratios of from 0.015 to 0.019 in number of atoms.

EXAMPLES 16 TO 18

Using the target used in Example 8, titanium-containing indium oxide thin films were formed in the same manner as in Example 8 except that only the oxygen level during the sputtering was increased (2% to 4%).

Then, the carrier electron concentration, the mobility of carrier electrons, the resistivity of each film and the extinction coefficient of each film at wavelengths of 1.3 μm, 1.55 μm and 1.6 μm were measured under the same conditions. The results are shown in Table 3.

-Evaluation- (1) The titanium-containing indium oxide thin films shown in Tables 1 to 3 have carrier electron concentrations of as low as 5.5×10$^{20}$/cm$^3$ or less. This is the factor that makes the films have small extinction coefficients in the near-infrared region. Meanwhile, in spite of low carrier electron concentrations, the films have resistivities of 9.5×10$^{-4}$ Ωcm or less, and some films have electrical resistivities of as very low as from 1.9×10$^{-4}$ Ωcm to 2.1×10$^{-4}$ Ωcm (Examples 6 and 7 and Examples 4 and 5). This is because, in all the films shown in Tables 1 to 3, the mobility of carrier electrons is 44 cm$^2$/Vsec or more, and in some films, as high as 70 cm$^2$/Vsec or more. This can be said to have materialized high electrical conductivity.

(2) Measurement by X-ray diffraction has revealed that all the titanium-containing indium oxide thin films shown in Tables 1 to 3 are films having good crystallinity. It has further been found that these are well crystalline films having bixbyite structure of indium oxide. Also, because of the fact that any peak due to crystal phases other than indium oxide phases is not observed, it has also been found that the titanium stands solid solution upon its substitution with the indium of indium oxide phases.

(3) Measurement by X-ray diffraction has revealed that films having amorphous structure or films in which crystalline phases and amorphous phases are mixedly present are obtained when the titanium-containing indium oxide thin films shown in Tables 1 to 3 are formed by sputtering on substrates kept at from room temperature to 138° C. It has

TABLE 3

| Example: | Oxygen level (%) | Carrier electron concentration (/cm$^3$) | Mobility of carrier electrons (cm$^2$/Vsec) | Film resistivity (Ωcm) | Extinction coefficient k | | |
|---|---|---|---|---|---|---|---|
| | | | | | 1.3 μm | 1.55 μm | 1.6 μm |
| 16 | 2 | 2.4 × 10$^{20}$ | 48 | 5.5 × 10$^{-4}$ | 0.035 | 0.055 | 0.061 |
| 17 | 3 | 1.9 × 10$^{20}$ | 46 | 7.2 × 10$^{-4}$ | 0.033 | 0.052 | 0.060 |
| 18 | 4 | 1.6 × 10$^{20}$ | 44 | 9.0 × 10$^{-4}$ | 0.030 | 0.051 | 0.058 | also been found that such films have a mobility of carrier electrons of 30 cm$^2$/Vsec or less and an electrical resistivity of $2\times10^{-3}$ Ωcm or more and have an insufficient electrical conductivity. However, it has still also been found that such films having amorphous structure or films in which crystalline phases and amorphous phases are mixedly present may be heat-treated at 150 to 350° C. in a vacuum ($1\times10^{-4}$ Pa to 1 Pa) or in an atmosphere of an inert gas such as nitrogen or argon, whereby the films come to have substantially the same mobility of carrier electrons and electrical resistivity as the well crystalline films shown in Tables 1 to 3, and can be used for what is aimed in the present invention. It has still also been found that, as long as such films having amorphous structure or films in which crystalline phases and amorphous phases are mixedly present are heated in the atmosphere at 150 to 200° C. for 10 minutes, the films come to have substantially the same mobility of carrier electrons and electrical resistivity as the well crystalline films shown in Tables 1 to 3, and can be used for what is aimed in the present invention.

(4) To summarize the foregoing, the well crystalline conductive oxide films (indium oxide films) according to the respective Examples are composed of Ti/In in proportions of from 0.003 to 0.120 as the ratios of number of atoms, have carrier electron concentrations of $5.5\times10^{20}$/cm$^3$ or less, and $2.0\times10^{20}$/cm$^3$ or less depending on fabrication conditions (Examples 14 and 15 and Examples 17 and 18). As the result, the films have coefficients of extinction of light waves, of as small as 0.240 or less at wavelengths of from 1.3 to 1.6 μm. In particular, they have coefficients of extinction of light waves, of 0.240 or less at a wavelength of 1.55 μm which is widely used in optical communication, and further show values of as small as 0.08 or less depending on film composition and fabrication conditions. The films also have mobilities of carrier electrons of as high as from 44 to 90 cm$^2$/Vsec, and hence show a high electrical conductivity. Such oxide electrode materials having small infrared-light reflection and absorption and a high electrical conductivity have never conventionally been available.

EXAMPLE 19

Fabrication of waveguide type optical control element in which ITiO film was used in control electrodes:

(Formation of Optical Waveguides)

Figure 2:
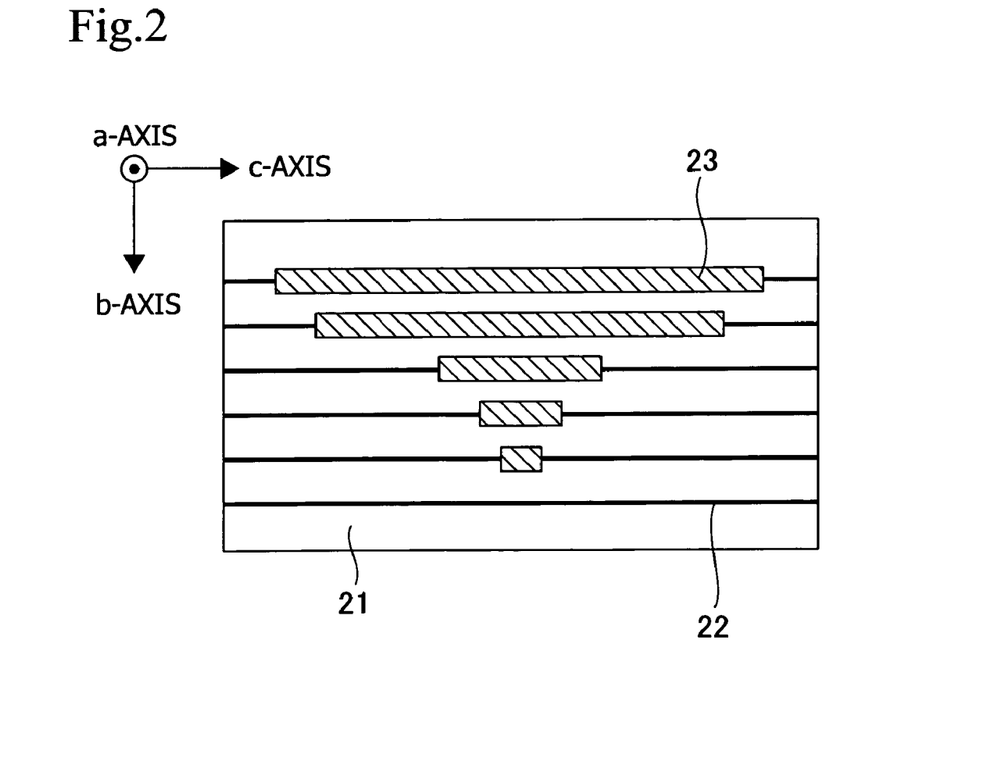
FIG. 2 is a plan view showing the shape of electrodes with varied electrode lengths in a waveguide type optical control element of Example 19.

To fabricate a waveguide type optical control element shown in FIG. 2, a plurality of Ti stripes of 8 μm in width and 70 mm in length each were linearly vacuum-deposited in parallel to the c-axis by photolithography on a single-crystal lithium niobate substrate 21 having a principal surface for the a-axis. This was exposed to the atmosphere for 9 hours at 1,050° C. to form optical waveguides 22. It was confirmed that these optical waveguides were single-mode operable to incident light of 1.55 μm in wavelength.

(Film Formation of Electrode Material)

On the surface of this waveguide type optical control element, a titanium-containing indium oxide thin film composed of Ti/In in a ratio of 0.008 in number of atoms (the same condition as that in Example 2) was formed in the same manner as in Example 2 just in a layer thickness of 300 nm.

(Patterning for Electrodes)

The indium oxide thin film formed on the substrate 21 by sputtering was subjected to patterning in the shape of electrodes by using the same photolithographic procedure as the formation of the optical waveguides, and electrodes 23 having a width of 100 μm each, lengths varied from 0 to 60 mm and a layer thickness of 300 nm each were formed just on the optical waveguides by reactive dry etching making use of HBr as a chief etching gas (see FIG. 2).

(Measurement of Loss Due to Electrodes)

Into the waveguide type optical control element thus obtained, laser beams of 1.55 μm in wavelength were guided from edge faces of the channel optical waveguides in the TM mode by using an optical fiber. The intensity of the light propagated through the interiors of the optical waveguides and thereafter came emergent from the other end faces of the optical waveguides was measured.

Figure 3:
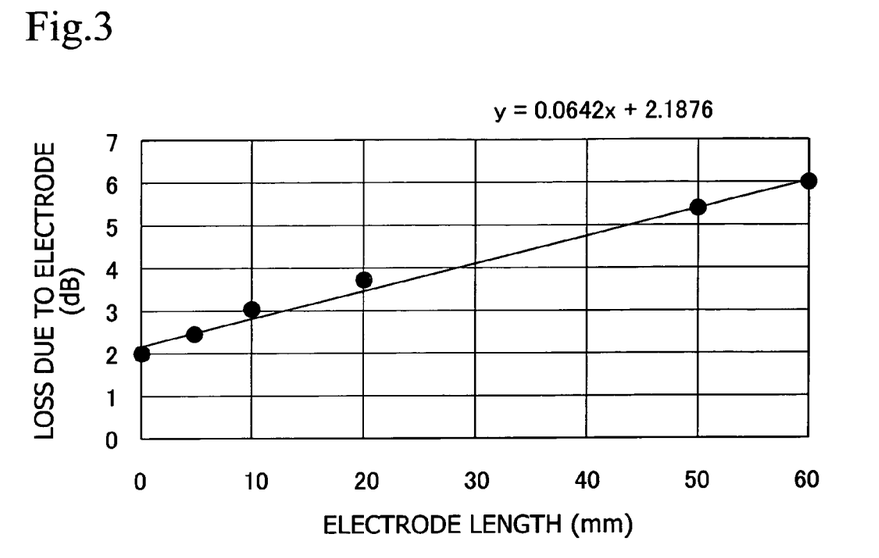
FIG. 3 is a graph showing the relationship between the electrode length and the loss related thereto, of the waveguide type optical control element of Example 19.

FIG. 3 shows the results of measurement of insertion loss with respect to each electrode length.

The excess loss of optical waveguides which was due to electrodes was calculated from the slant of the graph shown in FIG. 3. As the result, it was found to be 0.64 dB/cm. Meanwhile, the excess loss of optical waveguides which was due to aluminum metal electrodes used usually as electrodes was likewise measured. As the result, it was found to be 69.6 dB/cm.

Thus, it is confirmed that the control electrodes constituted of conductive oxide films (indium oxide films) according to this Example show a much smaller loss than the aluminum electrodes.

EXAMPLE 20

A waveguide type optical control element having the same structure as that in Example 19, in which the ITiO film was used in control electrodes, was fabricated in the same manner as in Example 19 except that a titanium-containing indium oxide thin film composed of Ti/In in a ratio of 0.017 in number of atoms (the same condition as that in Example 3) was formed in the same way as in Example 3 just in a layer thickness of 300 nm.

Then, the excess loss of optical waveguides which was due to ITiO film electrodes was calculated. As the result, it was found to be 0.74 dB/cm. This loss was very smaller than the excess loss (69.6 dB/cm) observed when the electrodes having the same structure were formed using metal aluminum as a material.

EXAMPLES 21 TO 27

Waveguide type optical control elements according to the respective Examples (Examples 21 to 27) each having the same structure as that in Example 19, in which the ITiO film was used in control electrodes, were fabricated in the same manner as in Example 19 except that a titanium-containing indium oxide thin film (Example 21) composed of Ti/In in a ratio of 0.003 in number of atoms (the same condition as that in Example 1), a titanium-containing indium oxide thin film (Example 22) composed of Ti/In in a ratio of 0.024 in number of atoms (the same condition as that in Example 4), a titanium-containing indium oxide thin film (Example 23) composed of Ti/In in a ratio of 0.033 in number of atoms (the same condition as that in Example 5), a titanium-containing indium oxide thin film (Example 24) composed of Ti/In in a ratio of 0.055 in number of atoms (the same condition as that in Example 6), a titanium-containing indium oxide thin film (Example 25) composed of Ti/In in a ratio of 0.088 in number of atoms (the same condition as that in Example 7), a titanium-containing indium oxide thin film (Example 26) composed of Ti/In in a ratio of 0.100 in number of atoms (the same condition as that in Example 8) and a titanium-containing indium oxide thin film (Example 27) composed of Ti/In in a ratio of 0.120 in number of atoms (the same condition as that in Example 9) were each formed just in a layer thickness of 300 nm.

Then, the excess loss of optical waveguides which was due to ITiO film electrodes was calculated. As the result, each element showed a low loss (1.0 dB/cm or less) like that in Example 19.

EXAMPLES 28 TO 36

Waveguide type optical control elements according to the respective Examples (Examples 28 to 36) each having the same structure as that in Example 19, in which the ITiO film was used in control electrodes, were fabricated in the same manner as in Example 19 except that a titanium-containing indium oxide thin film (Example 28) was formed in the same manner as in Example 10, a titanium-containing indium oxide thin film (Example 29) was formed in the same manner as in Example 11, a titanium-containing indium oxide thin film (Example 30) was formed in the same manner as in Example 12, a titanium-containing indium oxide thin film (Example 31) was formed in the same manner as in Example 13, a titanium-containing indium oxide thin film (Example 32) was formed in the same manner as in Example 14, a titanium-containing indium oxide thin film (Example 33) was formed in the same manner as in Example 15, a titanium-containing indium oxide thin film (Example 34) was formed in the same manner as in Example 16, a titanium-containing indium oxide thin film (Example 35) was formed in the same manner as in Example 17 and a titanium-containing indium oxide thin film (Example 36) was formed in the same manner as in Example 18, which were each formed just in a layer thickness of 300 nm.

Then, the excess loss of optical waveguides which was due to ITiO film electrodes was calculated. As the result, each element showed a low loss (1.0 dB/cm or less) like that in Example 19.

EXAMPLES 37 TO 42

Waveguide type optical control elements according to the respective Examples (Examples 37 to 42) each having the same structure as that in Example 19, in which the ITiO film was used in control electrodes, were fabricated in the same manner as in Example 19 except that titanium-containing indium oxide thin films each composed of Ti/In in a ratio of 0.017 in number of atoms were formed in a thickness of 100 nm (Example 37), in a thickness of 200 nm (Example 38), in a thickness of 500 nm (Example 39), in a thickness of 1,000 nm (Example 40), in a thickness of 2,500 nm (Example 41) and in a thickness of 5,000 nm (Example 42).

Then, the excess loss of optical waveguides which was due to ITiO film electrodes was calculated. As the result, it was 0.72 dB/cm (Example 37), 0.70 dB/cm (Example 38), 0.69 dB/cm (Example 39), 0.70 dB/cm (Example 40), 0.70 dB/cm (Example 41) and 0.70 dB/cm (Example 42), respectively, thus each element showed a low loss (1.0 dB/cm or less) like that in Example 19.

EXAMPLE 43

The optical waveguides shown in FIG. 2 were formed in the same manner as in Example 19. Thereafter, a titanium-containing indium oxide thin film (layer thickness: 300 nm) composed of Ti/In in a ratio of 0.017 in number of atoms (the same condition as that in Example 3) was formed by sputtering.

Figure 4:
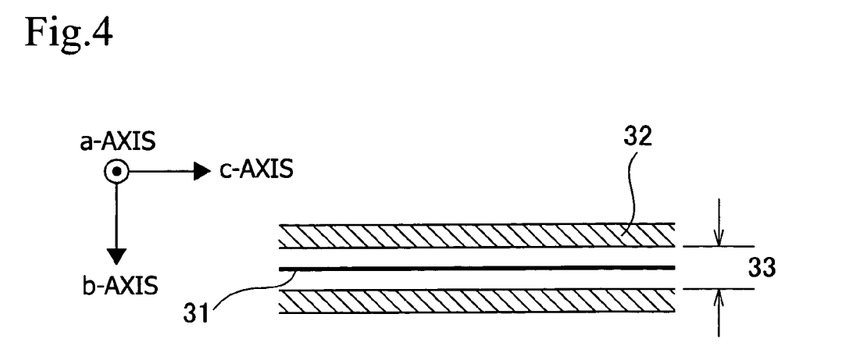
FIG. 4 is a plan view showing the shape of electrodes with varied gaps between electrodes in a waveguide type optical control element of Example 43.

Next, as shown in FIG. 4, electrodes 32 with varied gaps 33 between electrodes were formed on both sides of each optical waveguide 31 by reactive dry etching. Here, the electrodes 32 were 60 mm in length for those with any gaps.

Subsequently, like Example 19, into the waveguide type optical control element thus obtained, laser beams of 1.55 µm in wavelength were guided from edge faces of the channel optical waveguides in the TM mode by using an optical fiber. The intensity of the light propagated through the interiors of the optical waveguides and thereafter came emergent from the other end faces of the optical waveguides was measured.

Figure 5:
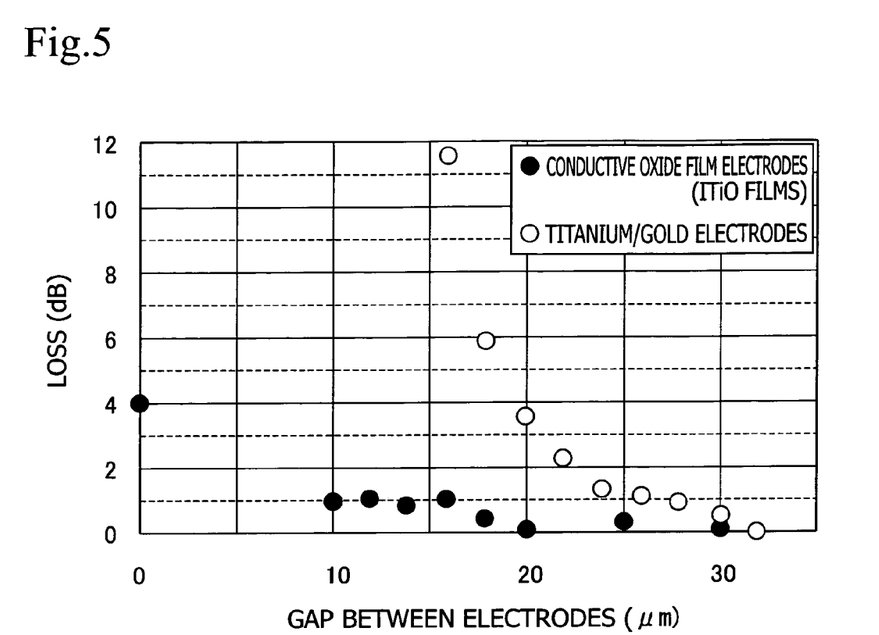
FIG. 5 is a graph showing the relationship between the gap between electrodes and the loss related thereto, of the waveguide type optical control element of Example 43.

In the FIG. 5 graph showing the relationship between the gap (µm) between electrodes and the loss (dB) related thereto, it was confirmed that, in those having gaps between electrodes of 20 µm or more, the loss due to the conductive oxide film electrodes according to this Example was substantially 0 dB (0.1 dB or less) as shown by black circles, and that, even in a case in which the gap between electrodes was as narrow as 10 µm, the loss was limited to an increase to only 1 dB.

Thus, the use of the above conductive oxide film electrodes makes it possible to narrow the gap between electrodes, and enables remarkable saving of voltages for controlling.

EXAMPLE 44

Formation of waveguide type optical control element making use of ITiO film in control electrodes and making use of Ti film and Au film as auxiliary electrodes:

A waveguide type optical control element having the same structure as that in Example 19, in which the ITiO film was used in control electrodes, was fabricated in the same manner as in Example 19 except that titanium-containing indium oxide thin films (layer thickness: 300 nm) composed of Ti/In in a ratio of 0.017 in number of atoms (the same condition as that in Example 3) were formed as control electrodes (gap between electrodes: 10 µm), and stacks of Ti films (layer thickness: 110 nm) and Au films (layer thickness: 60 nm) as auxiliary electrodes (gap between electrodes: 20 µm) (i,e, electrodes having ITiO/Ti/Au structure was used).

Then, the excess loss of optical waveguides which was due to ITiO film control electrodes and Ti film and Au film auxiliary electrodes was calculated. As the result, it was found to be 0.78 dB/cm. This loss was very smaller than the excess loss (2.1 dB/cm) of optical waveguides which was observed when aluminum metal electrodes used usually as electrode was used in control electrodes and the auxiliary electrodes were used.

EXAMPLES 45 TO 50

Waveguide type optical control elements according to the respective Examples (Examples 45 to 50) each having the same structure as that in Example 44, in which the ITiO film was used in control electrodes, were fabricated in the same manner as in Example 44 except that titanium-containing indium oxide thin films each composed of Ti/In in a ratio of 0.017 in number of atoms were formed in a thickness of 100 nm (Example 45), in a thickness of 200 nm (Example 46), in a thickness of 250 nm (Example 47), in a thickness of 400 nm (Example 48), in a thickness of 500 nm (Example 49) and in a thickness of 1,000 nm (Example 50).

Then, the excess loss of optical waveguides which was due to ITiO film control electrodes and Ti film and Au film auxiliary electrodes was calculated. As the result, it was 16.52 dB/cm (Example 45), 0.95 dB/cm (Example 46), 0.82 dB/cm (Example 47), 0.71 dB/cm (Example 48), 0.69 dB/cm (Example 49) and 0.69 dB/cm (Example 50), respectively, thus the loss was very smaller except for that in Example 45 than the excess loss (2.1 dB/cm) of optical waveguides which was observed when aluminum metal electrodes used usually as electrodes were used as control electrodes and the auxiliary electrodes were used. In particular, each element showed a low loss of 1.0 dB/cm or less when the conductive oxide films were 200 nm or more in layer thickness.

EXAMPLES 51 TO 57

Waveguide type optical control elements according to the respective Examples (Examples 51 to 57) each having the same structure as that in Example 44, in which the ITiO film control electrodes and the metallic auxiliary electrodes were used (i,e, the electrodes having ITiO/Ti/Au structure were used), were fabricated in the same manner as in Example 44 except that a titanium-containing indium oxide thin film (Example 51) composed of Ti/In in a ratio of 0.003 in number of atoms (the same condition as that in Example 1), a titanium-containing indium oxide thin film (Example 52) composed of Ti/In in a ratio of 0.024 in number of atoms (the same condition as that in Example 4), a titanium-containing indium oxide thin film (Example 53) composed of Ti/In in a ratio of 0.033 in number of atoms (the same condition as that in Example 5), a titanium-containing indium oxide thin film (Example 54) composed of Ti/In in a ratio of 0.055 in number of atoms (the same condition as that in Example 6), a titanium-containing indium oxide thin film (Example 55) composed of Ti/In in a ratio of 0.088 in number of atoms (the same condition as that in Example 7), a titanium-containing indium oxide thin film (Example 56) composed of Ti/In in a ratio of 0.100 in number of atoms (the same condition as that in Example 8) and a titanium-containing indium oxide thin film (Example 57) composed of Ti/In in a ratio of 0.120 in number of atoms (the same condition as that in Example 9) were each formed just in a layer thickness of 300 nm.

Then, the excess loss of optical waveguides which was due to ITiO film control electrodes and Ti film and Au film auxiliary electrodes was calculated. As the result, each element showed a low loss (1.0 dB/cm or less) like that in Example 44.

Comparative Examples 1 TO 4

Cases of Conventional ITO Films

On Corning 7059 glass substrates of 1.1 mm in thickness each, indium-tin oxide (ITO) films of 200 nm in layer thickness each, containing tin and not containing titanium and used conventionally in liquid-crystal cells for optical communication, were formed in the following way by sputtering to measure their electrical properties and optical properties.

The films were formed by sputtering carried out using a general-purpose $In_2O_3$ sintered-body target containing 10% by mass of $SnO_2$ and having a diameter of 6 inches, under application of a direct-current power of 160 W, by the use of argon gas mixed with 1% to 8% of oxygen, at a gas pressure of 0.6 Pa at the time of sputtering, setting the target-to-substrate distance at 60 mm and setting the substrate temperature at 200° C.

In regard to each film formed, the value of resistivity was calculated from the layer thickness and the value of surface resistance measured by the four-probe method. The carrier electron concentration and mobility in each film were also measured under the same conditions as those in Example 1 by using a hole effect measuring instrument (manufactured by Toyo Corporation). The optical constants [refractive index (n), extinction coefficient (k)] of each film were still also measured by spectral elipsometry (polarization analysis) in the same way as in Example 1.

The resistivity of ITO films was increasable by increasing the oxygen level during sputtering. As for indium oxide conductive oxide films, the carrier electron concentration can be decreased by increasing the oxygen level during sputtering to decrease oxygen deficiency level in film.

In the above conditions, only the oxygen level during sputtering was increased to form the ITO films according to Comparative Examples 1 to 4. On these films, the carrier electron concentration, the mobility of carrier electrons, the resistivity of each film and the extinction coefficient of each film at wavelengths of 1.3 μm, 1.55 μm and 1.6 μm were measured under the same conditions as those in Examples. The results are shown in Table 4.

TABLE 4

| Comparative Example: | Oxygen level (%) | Carrier electron concentration (/cm³) | Mobility of carrier electrons (cm²/Vsec) | Film resistivity (Ωcm) | Extinction coefficient k | | |
|---|---|---|---|---|---|---|---|
| | | | | | 1.3 μm | 1.55 μm | 1.6 μm |
| 1 | 1 | $1.5 \times 10^{21}$ | 32.3 | $1.3 \times 10^{-4}$ | 1.032 | 1.765 | 1.890 |
| 2 | 3 | $9.2 \times 10^{20}$ | 12.7 | $5.4 \times 10^{-4}$ | 0.913 | 0.955 | 1.102 |
| 3 | 6 | $6.3 \times 10^{20}$ | 8.3 | $1.2 \times 10^{-3}$ | 0.112 | 0.310 | 0.342 |
| 4 | 8 | $5.7 \times 10^{20}$ | 3.4 | $3.2 \times 10^{-3}$ | 0.102 | 0.256 | 0.295 |

Confirmation:

The following can be confirmed from Table 4.

(1) The ITO films according to Comparative Examples 1 and 2, produced at oxygen levels of 1% and 3%, respectively, have low resistivities, but their extinction coefficients of films at wavelengths of 1.3 μm to 1.6 μm are very larger than the ITiO films according to Examples as presented in Tables 1 to 3.

On the other hand, the extinction coefficients of films at wavelengths of 1.3 μm to 1.6 μm are decreased by increasing to 6% and 8% the oxygen level during sputtering (Comparative Examples 3 and 4), but the films have high resistivities, which are higher than the ITiO films according to Examples as presented in Tables 1 to 3. Such materials having inferior electrical conductivity can not be used as control electrodes of optical waveguides.

(2) From the measurement by X-ray diffraction, all the ITO films are found to have good crystallinity. The carrier electron concentration and mobility of carrier electrons in each film are measured by hole effect measurement. The ITO film according to Comparative Example 1, formed at an oxygen level of 1%, has a resistivity of as low as $1.3 \times 10^{-4}$ Ωcm but has a carrier electron concentration of as high as $1.5 \times 10^{21}$/cm³. Hence, the absorption and reflection of infrared light by carrier electrons have so great influence as to make the film has a large extinction coefficient.

The use of such a film in the control electrodes of a waveguide type optical control element makes the element have a large insertion loss because of a large absorption of the near-infrared light passing through the interiors of waveguides. In order to avoid this, the gap between electrodes must be set broad and a high drive voltage must be applied in order to induce the change in refractive index, so that any element drivable at a low voltage can not be materialized.

(3) The carrier electron concentration can be decreased by increasing the oxygen level during sputtering. The ITO film according to Comparative Example 4, formed at an oxygen level of 8% as shown in Table 4, has a carrier electron concentration of as low as $5.7 \times 10^{20}$/cm³ and also has a small extinction coefficient in the near-infrared region, but has a very high resistivity.

This is because the ITO film with a low resistivity has a low mobility of carrier electrons, and moreover, as a result of further incorporation of surplus oxygen into the film, the scattering due to neutral impurities has increased to cause a further lowering of the mobility of carrier electrons. Such materials having inferior electrical conductivity can not be used as control electrodes of optical waveguides.

Comparative Example 5

On a Corning 7059 glass substrate of 1.1 mm in thickness, a Ti metallic film used conventionally in liquid-crystal cells for optical communication was formed in the following way in the same manner as in Example 1 to measure its electrical properties and optical properties.

The film was formed by sputtering carried out using a Ti metallic target of 6 inches in diameter, under application of a direct-current power of 160 W, by the use of pure argon gas, at a gas pressure of 0.6 Pa, setting the target-to-substrate distance at 60 mm and setting the substrate temperature at room temperature.

In regard to the film formed, the value of resistivity was calculated from the layer thickness and the value of surface resistance measured by the four-probe method. The carrier electron concentration and mobility in the film were also measured under the same conditions as those in Example 1 by using a hole effect measuring instrument (manufactured by Toyo Corporation). The optical constants [refractive index (n), extinction coefficient (k)] of each film were still also measured by spectral elipsometry (polarization analysis) in the same way as in Example 1.

The Ti film had a resistivity of as low as 50 μΩcm, but had an extinction coefficient of from 4.2 to 4.7 at wavelengths of 1.3 μm to 1.55 μm, which was very higher than the ITiO film according to Example 1 as presented in Table 1.

or more, the loss due to electrodes was 3.5 dB or less as shown by white circles and also the loss due to electrodes was substantially 0 dB (0.1 dB or less) when the gap between electrodes was 32 μm.

Accordingly, because of a broad gap between electrodes, it can not be avoided to apply a high voltage for controlling.

Comparative Examples 9 and 10

Titanium-containing indium oxide thin films were formed in the same manner as in Example 1 except that a titanium-containing indium oxide thin film (Comparative Example 9) composed of Ti/In in a ratio of 0.002 in number of atoms and a titanium-containing indium oxide thin film (Comparative Example 10) composed of Ti/In in a ratio of 0.140 in number of atoms were formed. The values of resistivity of the films according to Comparative Examples 9 and 10, thus obtained, were calculated from the layer thickness and the value of surface resistance measured by the four-probe method.

The carrier electron concentration and mobility in the films according to Comparative Examples 9 and 10 were also determined from the above measurement of resistivity and by the measurement of hole effect by the van der Paw method (see, as noted previously, what is described in Physical-Engineering Experiments 2, Semiconductor Techniques Volume One, p. 105, by Katsufusa Shono, Tokyo University Publisher's Association) using a hole effect measuring instrument (manufactured by Toyo Corporation). The optical constants [refractive index (n), extinction coefficient (k)] of each indium oxide thin film were still also measured by spectral elipsometry (polarization analysis). The results of these are shown in Table 5.

TABLE 5

| Comparative Example: | Film composition, Ti/In ratio in number of atoms | Carrier electron concentration (/cm$^3$) | Mobility of carrier electrons (cm$^2$/Vsec) | Film resistivity (Ωcm) | Extinction coefficient k | | |
|---|---|---|---|---|---|---|---|
| | | | | | 1.3 μm | 1.55 μm | 1.6 μm |
| 9 | 0.002 | 2.0 × 10$^{20}$ | 32 | 9.8 × 10$^{-4}$ | 0.022 | 0.038 | 0.041 |
| 10 | 0.140 | 1.9 × 10$^{20}$ | 30 | 1.1 × 10$^{-3}$ | 0.029 | 0.038 | 0.042 |

Comparative Examples 6 and 7

Waveguide type optical control elements according to Comparative Examples 6 and 7 each having the same structure as that in Example 19, in which the ITiO film was used in control electrodes, were fabricated in the same manner as in Example 19 except that ITO films (layer thickness: 300 nm) according to Comparative Examples 2 and 3, respectively, were used as control electrodes.

Then, the excess loss of optical waveguides which was due to ITO film electrodes was calculated. As the result, it was found to be 8.3 dB/cm in both Comparative Examples. This loss was very higher than that of the waveguide type optical control element according to Example 19, in which the ITiO film was used in control electrodes.

Comparative Example 8

Optical waveguides were formed in the same manner as in Example 19. Thereafter, metal electrodes having a double-layer structure composed of titanium and gold widely used as electrode materials like aluminum were added thereon, and the same experiment as that in Example 43 was made. As the result, in the FIG. 5 graph showing the relationship between the gap (μm) between electrodes and the loss (dB) related thereto, and in those having gaps between electrodes of 20 μm The films according to Comparative Examples 9 and 10 as shown in Table 5 have composition which is outside the compositional range of conductive oxide films (Ti/In ratio in number of atoms is from 0.003 to 0.120) that is characteristic of the present invention. It is ascertained from the measurement by X-ray diffraction that the films according to Comparative Examples 9 and 10 are films having good crystallinity. However, these films have a resistivity of 9.8×10$^{-4}$ Ωcm or more, which does not fulfill the requirement in the present invention (resistivity is 9.5×10$^{-4}$ Ωcm or less) and is higher than that of the films of Examples 1 to 18 each. This tendency is more remarkable as the Ti/In ratio in number of atoms more comes outside the range of from 0.003 to 0.120, and the resistivity shows a tendency to increase.

The major factor of this is that the mobility of carrier electrons in the films according to Comparative Examples 9 and 10 is lower than that in the conductive oxide films of Examples 1 to 18 each. Accordingly, in order to obtain conductive oxide films having a high mobility of carrier electrons and a low resistivity as electrical properties, which are useful as electrodes for controlling near-infrared radiations, it is necessary that not only In$_2$O$_3$ is incorporated with Ti but also Ti is made present in a proportion of from 0.003 to 0.120 as Ti/In ratio in number of atoms.

Comparative Examples 11 and 12

Using the target used in Example 3, titanium-containing indium oxide thin films were formed in the same manner as in Example 3 except that only the oxygen level during the sputtering was decreased or increased (0.1% to 5%).

Then, the carrier electron concentration, the mobility of carrier electrons, the resistivity of each film and the extinction coefficient of each film at wavelengths of 1.3 μm, 1.55 μm and 1.6 μm were measured under the same conditions. The results are shown in Table 6.

TABLE 6

| Comparative Example: | Oxygen level (%) | Carrier electron concentration (/cm$^3$) | Mobility of carrier electrons (cm$^2$/Vsec) | Film resistivity (Ωcm) | Extinction coefficient k | | |
|---|---|---|---|---|---|---|---|
| | | | | | 1.3 μm | 1.55 μm | 1.6 μm |
| 11 | 0.1 | $6.0 \times 10^{20}$ | 15 | $7.0 \times 10^{-4}$ | 0.128 | 0.285 | 0.322 |
| 12 | 5 | $1.4 \times 10^{20}$ | 11 | $1.1 \times 10^{-3}$ | 0.022 | 0.050 | 0.054 |

These films were those formed using the same target, and were compositionally analyzed by ICP (inductively coupled plasma) emission spectroscopic analysis to find that these were in Ti/In ratios of from 0.015 to 0.019 in number of atoms.

However, the film of Comparative Example 11 has come to have a carrier electron concentration of $6.0 \times 10^{20}$/cm$^3$ because of introduction of excess oxygen defects, which concentration does not fulfill the requirement in the present invention (carrier electron concentration is $5.5 \times 10^{20}$/cm$^3$ or less) and is higher than that of the films of Examples 1 to 18 each; and has a large extinction coefficient in the near-infrared region. If such a film is used in electrodes for controlling the near-infrared light, any waveguide type optical control element having a high performance can not be fabricated because of a large loss.

The film of Comparative Example 12 has a resistivity of $1.1 \times 10^{-3}$ Ωcm, which does not fulfill the requirement in the present invention (resistivity is $9.5 \times 10^{-4}$ Ωcm or less) and is higher than that of the films of Examples 1 to 18 each. This is because oxygen is incorporated in excess in the film, so that neutral impurities have been formed in a large quantity to cause a lowering of the mobility of carrier electrons. Such a film having inferior electrical conductivity can not be used in control electrodes of waveguide type optical control elements.

POSSIBILITY OF INDUSTRIAL APPLICATION

The present invention makes it possible to provide a waveguide type optical control element which has been kept from DC drift and also can achieve low-voltage drive and a low loss against any incident polarized light, and a process for its fabrication.

Thus, this element is suited for its use in optical modulators, electro-optic photonic switches, polarized-light control devices and variable optical attenuators which are utilizable in optical fiber communication in the infrared region, promise a very small loss, and also are drivable at low voltages and of high performance.

The invention claimed is:

1. A waveguide type optical control element which comprises an optical waveguide made of an insulating material having an electro-optic effect or a thermo-optic effect, and a control electrode provided in contact with or proximity to the optical waveguide; the optical waveguide having a propagation loss which is 1 dB/cm or less at wavelengths of from 1.3 μm to 1.6 μm; wherein;

said control electrode is constituted of a conductive oxide film having a carrier electron concentration of $5.5 \times 10^{20}$/cm$^3$ or less and a resistivity of $9.5 \times 10^{-4}$ Ωcm or less, and the conductive oxide film has a coefficient of extinction of light waves, of 0.240 or less at a wavelength of 1.55 μm.

2. The waveguide type optical control element according to claim 1, wherein said conductive oxide film is a crystalline conductive oxide film composed chiefly of indium oxide and containing a titanium element in a proportion of from 0.003 to 0.120 as the ratio of titanium to indium in number of atoms.

3. The waveguide type optical control element according to claim 1 or 2, wherein said conductive oxide film has a thickness of from 100 nm to 5 μm.

4. The waveguide type optical control element according to claim 1 or 2, wherein, on the surface of said conductive oxide film, a metallic single-layer film or a multi-layer film is formed as an auxiliary electrode.

5. A process for fabricating the waveguide type optical control element according to claim 1 or 2, wherein;

the process for fabricating the waveguide type optical control element comprises the step of forming as a control electrode a conductive oxide film on, or in the vicinity of, an optical waveguide made of an insulating material having an electro-optic effect or a thermo-optic effect, where the conductive oxide film is formed by sputtering or ion plating making use of, as a raw material, an oxide sintered product which contains indium and titanium.

6. The waveguide type optical control element fabrication process according to claim 5, wherein, in forming said conductive oxide film as a control electrode by the sputtering, said film is formed under conditions that the distance between a substrate of said optical waveguide and a target is from 50 mm to 80 mm, the oxygen level in a film forming gas during film formation by sputtering is from 0.25% to 4% based on the level of argon gas, the film forming gas is at a pressure of from 0.3 Pa to 1.0 Pa, and the temperature of the substrate is set at from 140° C. to 350° C.

7. The waveguide type optical control element fabrication process according to claim 5, wherein, in forming said conductive oxide film as a control electrode, said oxide film is formed by sputtering carried out under conditions that the distance between a substrate of said optical waveguide and a target is from 50 mm to 80 mm, the oxygen level in a film forming gas during film formation by sputtering is from 0.25% to 4% based on the level of argon gas, the film forming gas is at a pressure of from 0.3 Pa to 1.0 Pa, and the temperature of the substrate is set at less than 140° C., and thereafter the oxide film formed is subjected to heat treatment at from 150° C. to 350° C.

8. The waveguide type optical control element fabrication process according to claim 7, wherein said heat treatment is carried out in a vacuum or in an atmosphere of an inert gas.

* * * * *